US010482380B2

(12) United States Patent
Le Grand et al.

(10) Patent No.: US 10,482,380 B2
(45) Date of Patent: Nov. 19, 2019

(54) CONDITIONAL PARALLEL PROCESSING IN FULLY-CONNECTED NEURAL NETWORKS

(71) Applicant: Amazon Technologies, Inc., Seattle, WA (US)

(72) Inventors: Scott Michael Le Grand, Soquel, CA (US); Rejith George Joseph, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 983 days.

(21) Appl. No.: 14/984,510

(22) Filed: Dec. 30, 2015

(65) Prior Publication Data

US 2017/0193368 A1  Jul. 6, 2017

(51) Int. Cl.
*G06N 3/08* (2006.01)

(52) U.S. Cl.
CPC ............. *G06N 3/088* (2013.01); *G06N 3/084* (2013.01)

(58) Field of Classification Search
CPC .......... G06N 3/08; G06N 3/084; G06N 3/088; G06N 3/02; G06N 3/063; G06N 3/0454; G06N 3/049; G06F 15/18
USPC ............................................... 706/12, 15, 19
See application file for complete search history.

(56) References Cited

U.S. PATENT DOCUMENTS

| | | | |
|---|---|---|---|
| 9,645,974 B1 * | 5/2017 | Patil | G06F 17/16 |
| 2005/0125369 A1 | 6/2005 | Buck et al. | |
| 2010/0017351 A1 * | 1/2010 | Hench | G06N 3/02 706/16 |
| 2013/0179722 A1 * | 7/2013 | Smith | G06F 13/4027 714/4.5 |
| 2014/0089232 A1 | 3/2014 | Buibas et al. | |
| 2014/0156575 A1 * | 6/2014 | Sainath | G06N 7/005 706/16 |
| 2014/0277718 A1 | 9/2014 | Izhikevich et al. | |
| 2015/0046332 A1 | 2/2015 | Adjaoute | |
| 2016/0217367 A1 * | 7/2016 | Moreno | G10L 15/16 |
| 2016/0342891 A1 * | 11/2016 | Ross | G06F 15/8046 |
| 2016/0342893 A1 * | 11/2016 | Ross | G06N 3/063 |

OTHER PUBLICATIONS

Seide, Frank, et al. "On Parallelizability of Stochastic Gradient Descent for Speech DNNS" 2014 IEEE International Conference on Acoustic, Speech, and Signal Processing (ICASSP), 5 pages.

* cited by examiner

*Primary Examiner* — Dave Misir
(74) *Attorney, Agent, or Firm* — Knobbe, Martens, Olson & Bear, LLP (57) ABSTRACT

The present disclosure is directed to parallelization of artificial neural network processing by conditionally synchronizing, among multiple computer processors, either the input or output of individual operations, and by conditionally using either rows or columns of certain matrices used in the operations. The conditional processing may depend upon the relative sizes of the input and output of the specific operations to be performed. For example, if a current layer matrix of values is larger than a next layer matrix of values to be computed, then rows of a weight matrix may be used by the computer processors to compute the next layer matrix. If the current layer matrix is smaller than the next layer matrix, then columns of the weight matrix may be used by the computer processors to compute the next layer matrix.

20 Claims, 6 Drawing Sheets

$$\begin{bmatrix} a_{1,1} & \cdots & \cdots \\ \vdots & \ddots & \vdots \\ \vdots & & \vdots \\ \vdots & & \vdots \\ \cdots & \cdots & a_{5,4} \end{bmatrix} \times \begin{bmatrix} b_{1,1} & \cdots & \\ \vdots & \ddots & \vdots \\ \vdots & & \vdots \\ \cdots & \cdots & b_{4,3} \end{bmatrix} = \begin{bmatrix} c_{1,1} & \cdots & \\ \vdots & \ddots & \vdots \\ \vdots & & \vdots \\ \vdots & & \vdots \\ \cdots & \cdots & c_{5,3} \end{bmatrix}$$

CONDITIONAL PARALLEL PROCESSING IN FULLY-CONNECTED NEURAL NETWORKS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In recognition systems, such as systems designed to recognize speech, handwriting, faces, and the like, NN-based models may generate probability scores via the forward pass. The probability scores may indicate the probability that the input corresponds to a particular label, class, or the like.

The parameters of a NN can be set in a process referred to as training. For example, a NN-based model can be trained using training data that includes input data and the correct or preferred output of the model for the corresponding input data. Sets of individual input vectors ("mini-batches") may be processed at the same time by using an input matrix instead of a single input vector. The NN can repeatedly process the input data, and the parameters (e.g., the weight matrices) of the NN can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 3 is a block diagram illustrating parallel processing of a matrix multiplication operation in which an output matrix is smaller than an input matrix.

FIG. 4 is a block diagram illustrating parallel processing of a matrix multiplication operation in which an output matrix is larger than an input matrix.

DETAILED DESCRIPTION

The present disclosure is directed to parallelization of artificial neural network processing by conditionally synchronizing, among multiple computer processors, either the input or output of individual operations, and by conditionally using either rows or columns of certain matrices used in the operations. The conditional processing may depend upon the relative sizes of the input and output of the specific operations to be performed. Thus, the systems and methods described herein provide efficient parallelization for artificial neural network processing by minimizing or otherwise reducing the communication required between individual computer processors for performing various artificial neural network operations in parallel. Such efficiently parallelized artificial neural networks may be used in a variety of machine learning applications and other systems, including but not limited to: product recommendation generation, automatic speech recognition, facial recognition, handwriting recognition, and image recognition.

Generally described, artificial neural networks ("NNs"), including but not limited to deep neural networks ("DNNs"), have multiple layers of nodes. Illustratively, a NN may include an input layer, and output layer, and any number of intermediate or "hidden" layers between the input and output layers. The individual layers may include any number of separate nodes. Nodes of adjacent layers may be connected to each other, and each connection between the various nodes of adjacent layers may be associated with a respective weight. Conceptually, a node may be thought of as a computational unit that computes an output value as a function of a plurality of different input values. The input values may include the output of nodes in a previous layer, multiplied by weights associated with connections between the nodes in the previous layer and the current node. When a NN processes input data in the form of a matrix of input vectors (e.g., a batch of training data input vectors), the NN may perform a "forward pass" to generate a matrix of output vectors. The input vectors may each include n separate data elements or "dimensions," corresponding to the n nodes of the NN input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

Some conventional methods of parallelizing neural network processing require each processor to store a separate copy of the neural network. The individual processors then process separate batches of input data (e.g., matrices of training data input vectors), and synchronize their parameters at various points to ensure that each processor has a complete, up-to-date copy of the neural network. However, some neural networks have a substantial number of individual parameters (e.g., hundreds of thousands, millions, tens of millions, or more). Such large NNs may not fit on a single processor (e.g., a large NN may require more memory than is available to a single processor). Moreover, even when the entire network does fit on a single processor, synchronization of the parameters between different processors can require a substantial amount of bandwidth.

Some aspects of the present disclosure relate to conditionally synchronizing, among multiple computer processors, either the input or output of individual neural network operations, and by conditionally using either rows or columns of certain matrices used in the neural network operations. The conditional processing may depend upon the relative sizes of the input and output of the specific operations to be performed. For example, if an input matrix for a particular operation is larger than an output matrix to be computed, the individual processors may each generate intermediate results using their own subset of columns of the input matrix and subset of rows of another matrix (e.g., a matrix of weights) by which the input matrix is to be multiplied. The intermediate results are then communicated around to the other processors, and each processor uses the intermediate results to compute the output matrix columns that correspond to that processor. As another example, if the input matrix is smaller than the output matrix, then the input matrix may be synchronized across all individual processors. The individual processors may then generate their respective output matrix columns by using a full input matrix and certain columns of another matrix, without requiring any communication of intermediate results.

Additional aspects of the present disclosure relate to specialized computing device configurations to facilitate the efficient parallelization of neural network processing. A computing system may include a plurality of separate hardware-based computer processors. Subsets of the computer processors may communicate with each other via a switch, such that different subsets of computer processors communicate within their own subsets through their own dedicated switches. In some conventional systems, such a setup may cause contention when computer processors of one subset are communicating with computer processors of another subset, because the computer processors communicate by transmitting data through the two separate switches for the two different subsets. However, by configuring the computer processors in a logical peer-to-peer ring, any computer processor may transmit data to any other computer processor by relaying data around the ring. In this implementation, the computer processors of different subsets may communicate with no contention.

Various aspects of the disclosure will now be described with regard to certain examples and embodiments, which are intended to illustrate but not limit the disclosure. Although the examples and embodiments described herein will focus, for the purpose of illustration, on parallel processing in fully-connected neural networks, the examples are illustrative only and are not intended to be limiting. In some embodiments, parallel processing may be applied to matrix multiplication generally, without requiring fully-connected neural networks, or without requiring any neural network operations (e.g., general matrix multiplication processes may be parallelized).

Example Artificial Neural Network

Figure 1:
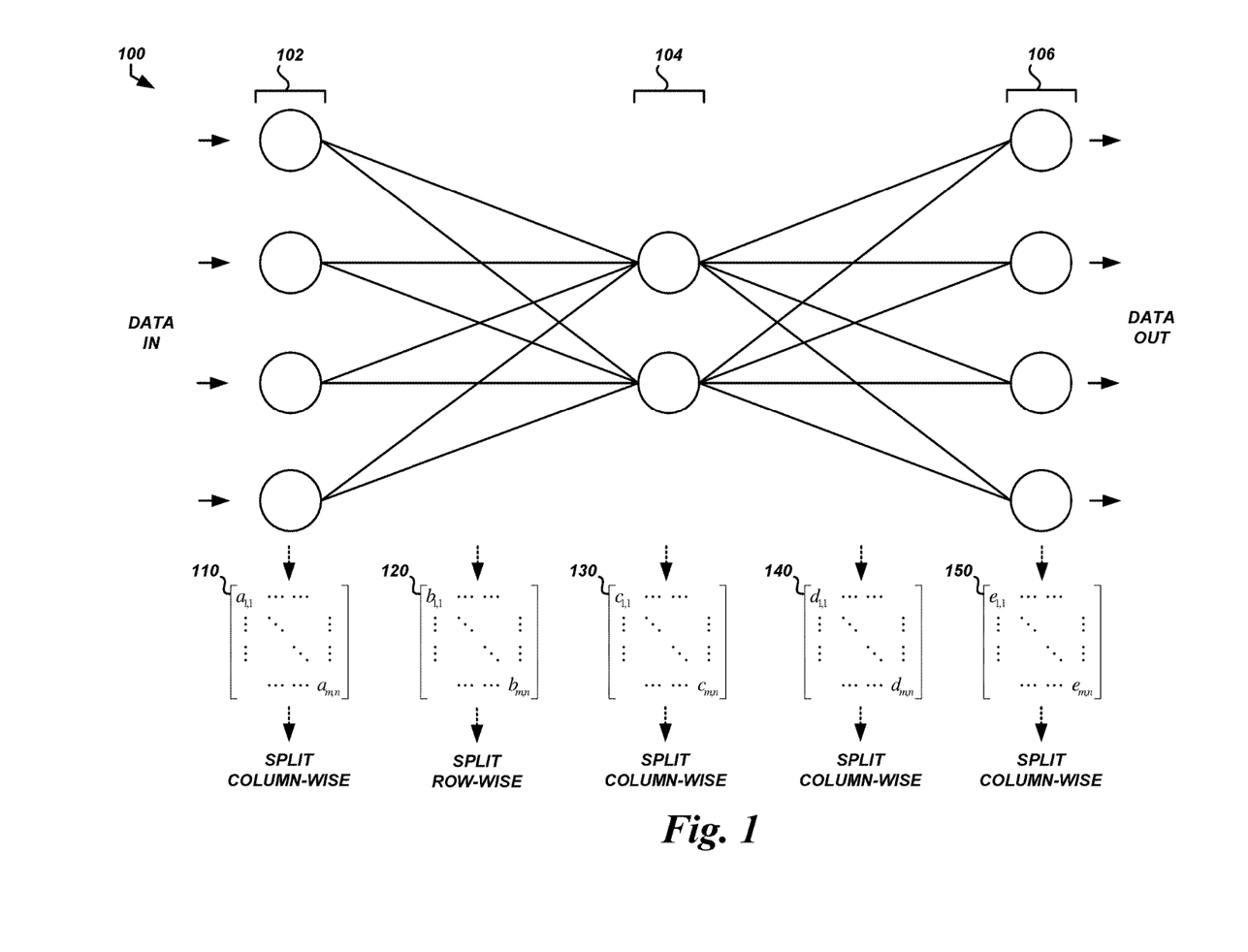
FIG. 1 is a diagram of an illustrative artificial neural network with multiple layers, indicating how the layers are to be distributed among multiple computer processors for parallel processing.

FIG. 1 illustrates an example NN 100 in which conditional parallel processing may be implemented. As shown, the NN 100 has a first layer 102 with a plurality of nodes, a second layer 104 with a plurality of nodes, and a third layer 106 with a plurality of nodes. The specific number of layers and number of nodes per layer shown in FIG. 1 are illustrative only, and are not intended to be limiting. In some NNs, different numbers of layers and/or different numbers of nodes in individual layers may be used. For example, although first layer 102, second layer 104, and third layer 106 are shown with four, two, and four nodes respectively, in some NNs the layers may have hundreds or thousands of nodes, each layer may have the same or a different number of nodes as each other layer, the second layer 104 may have more nodes that the first layer 102 or third layer 106, etc. As another example, although only three layers are shown, in some NNs there may be 4, 5, 10, or more layers.

Input to the NN 100 occurs at the first layer 102. A single input to the NN 100 may take the form of an input vector with n data elements, where n is the number of nodes in the first layer 102. The individual data elements may be numbers, such as floating point numbers, that have been generated by some other process (e.g., by extracting acoustic feature data from an audio input signal). In some cases, multiple input vectors may be input into—and processed by—the NN 100 at the same time. For example, when the NN is being trained, a set of training data input vectors (e.g., a "mini batch") may be arranged as an input matrix 110. Each row of the input matrix 110 may correspond to an individual training data input vector, and each column of the input matrix 110 may correspond to an individual node of the first layer 102. The data element in any given input vector for any given node of the first layer 102 may be located at the corresponding intersection location in the input matrix 110.

As shown, NN 100 is a fully-connected NN. Each node in the first layer 102 is connected to each node in the second layer 104, and each node in the second layer 104 is connected to each node in the third layer 106. The connections between individual nodes of adjacent layers are each associated with a trainable parameter, or weight, that is applied to the value passed from the prior layer node to the subsequent layer node. The weights associated with the connections from the first layer 102 to the second layer 104 may be arranged in a weight matrix 120. The individual rows in the weight matrix 120 may correspond to the individual nodes in the first layer 102, and the individual columns in the weight matrix 120 may correspond to the individual nodes in the second layer 104. The weight associated with a connection from any node in the first layer 102 to any node in the second layer 104 may be located at the corresponding intersection location in the weight matrix 120. The weights associated with the connections from the second layer 104 to the third layer 104 may be arranged in a weight matrix 140, similar to weight matrix 120.

In a conventional system, an input matrix 110 would be provided to a computer processor that stores or otherwise has access to the entire weight matrix 120. The processor would then multiply the input matrix 110 by the weight matrix 120 to produce a matrix 130. The processor may adjust individual values in the matrix 130 using an offset or bias that is associated with the second layer 104 (e.g., by adding or subtracting a value separate from the weight that is applied). In addition, the processor may apply an activation function to the individual values in the matrix 130 (e.g., by using the individual values as input to sigmoid function). The matrix 130 may then serve as a second layer matrix, and may be the input matrix in a process to calculate values for the third layer 106.

As shown in FIG. 1, however, the weight matrix 120 may be split among a plurality of different computer processors, and the processors may generate different portions of the matrix 130 in parallel. For example, the weight matrix 120 may be striped row-wise (separated into subsets of rows), and each processor may be provided with a different subset of the rows. The input matrix 110 may be striped column-wise (separated into subsets of columns), and each processor may be provided with a different subset of the columns. As described in greater detail below, the individual processors may then each generate an intermediate matrix by multiplying their respective subsets of input matrix 110 columns and weight matrix 120 rows. The processors may then generate the matrix 130 by communicating their respective intermediate matrices to the other processors. In some embodiments, the matrix 130 may be generated by performing a series of "reduction" operations or some equivalent operation in which multiple sets of numbers—the intermediate matrices in this example—are reduced into a single set of numbers—the subset of columns of matrix 130 to be stored on an individual processor. A reduction operation can be performed to aggregate, from the intermediate matrices, each separate subset of columns to be stored on each individual processor. In some cases, the reduction operations may be performed substantially in parallel or otherwise at least partially overlapping in time.

As another example, a weight matrix 140 may be striped column-wise (separated into subsets of columns). However, in contrast to the example described above, each processor may be provided with a complete copy of the input matrix 110 or of a matrix generated using the process described above, such as the matrix 130, instead of a subset of columns of the matrix. This may be accomplished by performing an "allgather" operation or some equivalent operation in which multiple sets of numbers—subsets of the matrix 130 in this example—are gathered into a single set of numbers—the complete matrix 130—that is available in its entirety to each of the processors. As described in greater detail below, the individual processors may then each generate a subset of the columns of a matrix, such as matrix 150, by multiplying their respective copies of the matrix 130 and subsets of columns of weight matrix 140.

Figure 2:
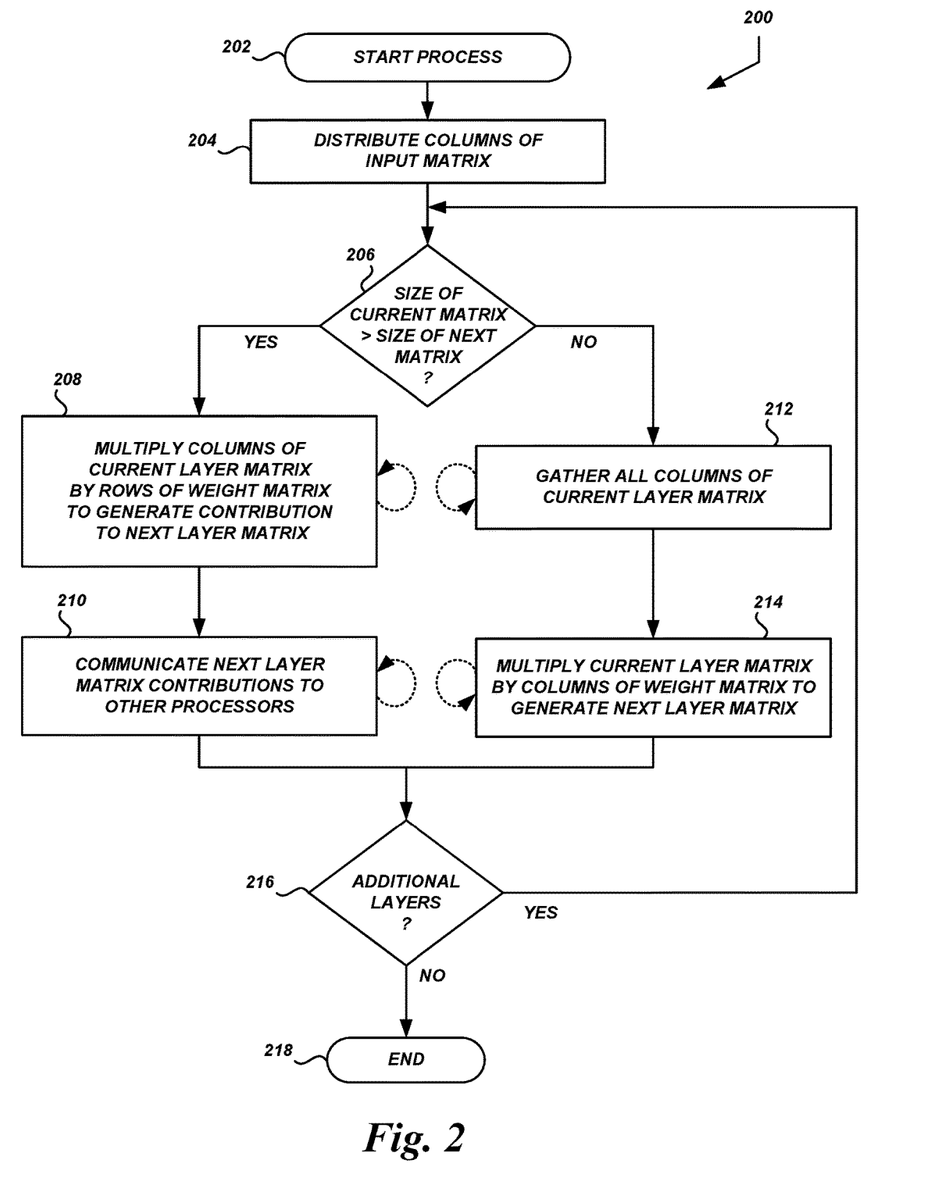
FIG. 2 is a flow diagram of an illustrative process for conditional parallel processing in a fully connected artificial neural network.

In some embodiments, as shown in FIG. 1 and described in greater detail below, parallel processing of a single NN 100 may be implemented using both row-wise and column-wise distribution of weight matrices among multiple computer processors. The determination of whether to use row-wise or column-wise distribution for any particular weight matrix of the NN 100 can be a conditional determination based on the relative sizes of the other matrices in the in the operation Example Process for Conditional Parallel Processing FIG. 2 is a flow diagram of an illustrative process 200 for conditional parallel processing in a fully connected artificial neural network. The process 200 may be embodied in a set of executable program instructions stored on a computer-readable medium, such as one or more disk drives, of a computing system, such as the computing system 500 shown in FIG. 5 and described in greater detail below. When the process 200 is initiated, the executable program instructions can be loaded into memory, such as RAM, and executed by one or more processors of the computing system 500. Although the process 200 is described with respect to the computing system 500 shown in FIG. 5, the description is illustrative only and is not intended to be limiting. In some embodiments, the process 200 or portions thereof may be performed in parallel by multiple separate computing systems instead of, or in addition to, being performed in parallel by multiple separate processors of the computing system 500.

The process 200 begins at block 202. In some embodiments the process may begin upon receipt of input data, such as an input matrix 110 matrix of training data as shown in FIG. 1 and described in greater detail above.

Figure 5:
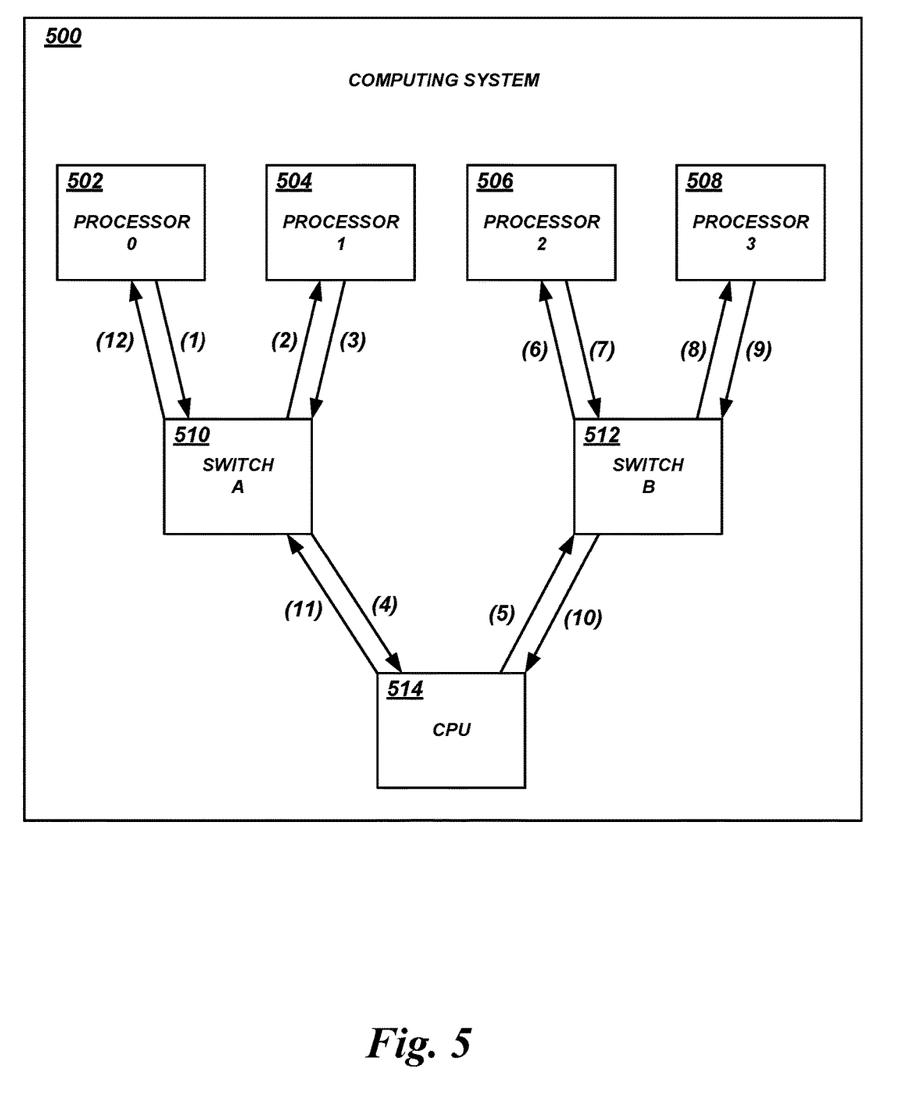
FIG. 5 is a block diagram of an illustrative computing system configured to implement conditional parallel processing of artificial neural networks.

At block 204, the computing system 500 can distribute the input matrix 110 among the individual processors of the computing system 500. For example, if the computing system has four processors 502, 504, 506, and 508, as shown in FIG. 5, the computing system 500 may separate the input matrix 110 into four subsets of columns, and distribute a different subset to each of the processors.

At decision block 206, the computing system 500 can determine whether the current matrix (the input matrix 110 in this example) is larger than the next matrix to be computed (matrix 130 for the second layer 104 in this example). The determination may be based on one or more size-related characteristics of the respective matrices. For example, the determination may be based on how many elements are in each of the respective matrices, how many nonzero data values are in each of the respective matrices, how many rows are in each of the respective matrices, how many columns are in each of the respective matrices, how much bandwidth is required to transmit each of the respective matrices, how much time transmission of each of the respective matrices to each of the processors is expected to take, how much memory each of the respective matrices takes, some combination thereof, etc. If the current matrix is larger than the next matrix to be calculated, the process 200 proceeds to block 208. Otherwise, the process proceeds to block 212.

In some embodiments, the process 200 proceeds to block 208 if the size of the current matrix is 1.5 times as big as the size of the next matrix to be calculated; otherwise, the process 200 proceeds to block 210. For example, the number of nodes in the most-recently calculated layer may be multiplied by 2 for a product of $2n_i$, where $n_i$ is the number of nodes in the most-recently calculated layer i. The number of nodes in the next layer to be calculated may be multiplied by 3 for a product of $3n_{i+1}$, where $n_{i+1}$ is the number of nodes in the next layer to be calculated i+1. If $2n_i > 3n_{i+1}$, then the process 200 may proceed to block 208; otherwise, the process 200 may proceed to block 210. In other embodiments, the process 200 proceeds to block 210 if the size of the next matrix to be calculated is 1.5 times as big as the size of the current matrix; otherwise the process proceeds to block 208. For example, if $2n_{i+1} > 3n_i$, then the process 200 may proceed to block 210; otherwise, the process 200 may proceed to block 208.

At block, 208, the computing system 500 has determined that the current matrix is larger than the next matrix to be computed (e.g., the size of input matrix 110 is greater than the size of matrix 130) or would otherwise require more time and/or resources to transmit to synchronize with the other computer processors. In this case, the individual computer processors multiply their own subsets of columns of the current matrix by their own subsets of rows of the current weight matrix. In some embodiments, the subsets of rows of the current weight matrix 120 have already been stored on, or are otherwise accessible by, the corresponding individual computer processors. For example, when the NN 100 is loaded on the computing system 500, when the process 200 is initiated, or at some other time, the subsets of rows and/or columns of the various weight matrices of the NN 100 may be stored on or otherwise made accessible to the corresponding computer processors. This may happen before processing input matrices because the structure of the NN 100 (the sizes of the respective layers, and therefore the sizes of the input and output matrices for each NN operation) is predetermined.

FIG. 3 illustrates an example of multiplying input matrix 110 by weight matrix 120 to generate matrix 130 according to the conditional parallel processing described above. As shown, input matrix 110 includes five rows of input vectors, and four columns of data elements corresponding to the four nodes of the first layer 102 of the NN 100. Weight matrix 120 includes two rows of weights corresponding to the two nodes of the second layer 104, and four columns of weights corresponding to the four columns of the input matrix 110. Matrix 130 includes five rows for data computed from the five rows of input vectors, and two columns of data elements corresponding to the two nodes of the second layer 104. Illustratively, the columns of the input matrix 110 may split into substantially equal-sized subsets among the various processors, or the columns may be split based upon performance characteristics of the respective processors (e.g., faster processors or processors with more memory may be provided with larger subsets of columns). In a similar manner, the rows of the weight matrix 120 may be split into substantially equally-sized subsets among the various processors, or the rows may be split based on performance characteristics of the respective processors.

Processor 502 multiplies column subset 302 from input matrix 110 by row subset 312 from weight matrix 120 to generate intermediate matrix 322. Because processor 502 has only a subset of rows from weight matrix 120, processor 502 cannot compute a complete column or subset of columns for matrix 130. Instead, processor 502 computes an intermediate matrix 322 that is the same size as matrix 130 (has the same number of rows and columns), but which must be aggregated with the intermediate matrices computed by the other processors in order to generate the completed matrix 130. In a similar manner, processor 504 multiplies column subset 304 from input matrix 110 by row subset 314 from weight matrix 120 to generate intermediate matrix 324. Processor 506 multiplies column subset 306 from input matrix 110 by row subset 316 from weight matrix 120 to generate intermediate matrix 326. Processor 508 multiplies column subset 308 from input matrix 110 by row subset 318 from weight matrix 120 to generate intermediate matrix 328.

Returning to FIG. 2, at block 210 the processors of the computing system 500 communicate their respective contributions to the computed matrix to the other processors. For example, the processors can communicate portions of their respective intermediate matrices to the other processors so that the portions can be aggregated and the columns of matrix 130 that correspond to each processor can be computed. Illustratively, individual columns of matrix 130 can be aggregated from the corresponding columns of the various intermediate matrices (e.g., column 1 may be computed by aggregating column 1 from each of the intermediate matrices). This aggregation may occur as the portions of the various intermediate matrices are communicated around a ring configuration of the computer processors, such as the ring configuration shown in FIG. 5.

In the present example, if column 1 of matrix 130 is to be stored on processor 502, then column 1 from intermediate matrix 324 may be communicated from processor 504 to processor 506, where the column is added to column 1 from intermediate matrix 326. The aggregate column may then be communicated from processor 506 to processor 508, where it is aggregated with column 1 from intermediate matrix 328. The aggregate column may then be communicated from processor 508 to processor 502, where it is aggregated with column 1 from intermediate matrix 322 to complete the calculation of column 1 of matrix 130. In a similar manner, the other columns of matrix 130 may be aggregated from the corresponding columns of the various intermediate matrices to their final destinations on the other processors at substantially the same time. Thus, the fully computed columns of matrix 130 will be spread across the individual processors.

At decision block 216, the computing system 500 can determine whether there are additional layers in the NN (e.g., whether there are additional matrices to be computed). If there are additional layers, the process 200 can return to decision block 206 to determine the relative sizes of the input and output matrices, as described above. Otherwise, if there are no additional layers, the process may end at block 218. The output of the NN may then be accessed by a downstream process.

Returning to block 206, the computing system 500 can determine whether the current matrix (matrix 130 in this example) is larger than the next matrix to be computed (matrix 150 for the third layer 106 in this example). Because the current matrix 130 is smaller than the next matrix 150 to be computed, the process 200 can proceed to block 212 rather than block 208.

At block, 212, the computing system 500 can ensure that each computer processor has a complete copy of the current matrix 130. As described above, when the current matrix is larger than the matrix being computed, the computer processors communicate portions of intermediate matrices to each other. This is done so that each processor can compute its own subset of the matrix being computed, and the larger current matrix does not need to be communicated to each of the processors prior to computing the matrix being computed. Thus, in the present example, the current matrix 130 is scattered column-wise across multiple computer processors as a result of the processing described above at block 210. However, because the current matrix 130 is smaller than the matrix 150 now being computed, it is more efficient to gather the current matrix 130 onto each of the processors before computing the matrix 150. Therefore, prior to computing the matrix 150, the computing system 500 performs an "allgather" operation or some equivalent operation such that the column subsets of the matrix 130 are gathered into a single set of numbers on (otherwise available to) each of the computer processors.

At block 214, the individual computer processors multiply the current matrix 130 by their own subsets of columns of the current weight matrix 150. In some embodiments, the subsets of columns of the current weight matrix 150 have already been stored on, or are otherwise accessible by, the corresponding individual computer processors. For example, when the NN is loaded on the computing system 500, when the process 200 is initiated, or at some other time, the subsets of rows and/or columns of the various weight matrices may be stored on or otherwise made accessible to the corresponding computer processors. This may happen before processing input matrices because the structure of the NN (the sizes of the respective layers, and therefore the sizes of the input and output matrices for each NN operation) is predetermined.

FIG. 4 illustrates an example of multiplying current matrix 130 by weight matrix 140 to generate matrix 150 according to the conditional parallel processing described above. As shown, matrix 130 includes five rows of data corresponding to the five original input vectors of the input matrix 110. Matrix 130 also has two columns of data elements corresponding to the two nodes of the second layer 104 of the NN 100. Weight matrix 140 includes four rows of weights corresponding to the four nodes of the third layer 106, and two columns of weights corresponding to the two nodes of the second layer 104. Matrix 150 includes five rows for data computed from the five rows of input vectors, and four columns of data elements corresponding to the four nodes of the third layer 106.

Processor 502 multiplies matrix 130 by column subset 412 from weight matrix 140 to generate column subset 422 of matrix 150. Because processor 502 has a complete copy of matrix 130 and a subset of columns of the weight matrix 140, processor 502 can directly compute its columns of matrix 150, without first computing an intermediate matrix and communicating with other processors to aggregate portions of other intermediate matrices in order to compute the subset of columns of matrix 150 that are assigned to processor 502. In a similar manner, processor 504 multiplies matrix 130 by column subset 414 from weight matrix 140 to generate column subset 424 of matrix 150. Processor 506 multiplies matrix 130 by column subset 416 from weight matrix 140 to generate column subset 426 of matrix 150. Processor 508 multiplies matrix 130 by column subset 418 from weight matrix 140 to generate column subset 428 of matrix 150.

Returning to decision block 216 of FIG. 2, the computing system 500 can determine whether there are additional layers of the NN to be processed. In the present example, there are no more layers, and the process 200 can end at block 218. The output matrix of the NN can then be accessed by a downstream process. For example, a function may be performed on the columns of the output matrix stored on each individual processor to generate a scalar output value. The scalar output value may then be used by a downstream process, thereby avoiding the need to perform a final "reduction" or "gather" operation to gather the individual columns from the corresponding processors into a single matrix that is transmitted or stored.

The process 200 can be used during performance of various NN operations. For example, the process 200 can be used to perform a "forward pass" on input such as the matrix of training data input vectors as described above. As another example, the process 200 can be used during the update phase of training, known as "back propagation." In back propagation, the training error may be determined and used to update the individual parameters (e.g., weights) of the NN in order to reduce the training error. Illustratively, the training error may be computed using a function that is based on the difference between training data output (e.g., the matrix 150) and the expected output. A gradient may then be computed to determine how the weights in the weight matrix 120 and 140 are to be adjusted to reduce the error. The adjustments may be propagated back through the NN 100 layer-by-layer using the parallel processing described above.

In some embodiments, the process 200 (or portions thereof) may be used to implement parallel processing of matrix multiplication generally, rather than specifically multiplying matrices of NN data. For example, the input matrix 110 and first weight matrix 120 may be any operand matrices used to compute a product matrix, rather than a NN input matrix and weight matrix used to compute a second layer matrix 130. As another example, the second layer matrix 130 and second weight matrix 140 may be any operand matrices used to compute a product matrix, rather than a NN layer matrix and weight matrix used to compute a third layer matrix 150.

Example Computing System

FIG. 5 illustrates an example computing system 500 configured to execute the processes and implement the features described above. In some embodiments, the computing system 500 may include a plurality of computer processors 502, 504, 506, and 508. One or more of the processors 502, 504, 506, 508 may be a graphics processing unit ("GPU") or any other type of hardware-based computer processor. The processors may communicate with other processors and other system components via controllers or switches, such as switches 510 and 512. One or more of the switches 510 and 512 may be a Peripheral Component Interconnect Express ("PCIE") switch or any other type of hardware-based switch. A central processing unit ("CPU") 514 may coordinate the activities of the various processors 502, 504, 506, and 508 and other system components.

Although FIG. 5 shows a computing system 500 with four processors, two switches, and a single CPU, the example shown is illustrative only and is not intended to be limiting. In some embodiments, a computing system 500 may have additional or fewer processors, switches, CPUs, and/or other components. In addition to the components shown in FIG. 5 and otherwise described herein, a computing system 500 may include various other components, such as one or more network interfaces (e.g., network interface cards), one or more computer readable medium drives (e.g., high density disks, solid state drives, flash drives, and/or other persistent non-transitory computer-readable media), an input/output device interface (e.g. an IO interface in communication with one or more microphones or display screens), and one or more computer readable memories (e.g., random access memory and/or other volatile non-transitory computer-readable media). A computer readable memory may include computer program instructions that the CPU 514 and/or the computer processors 502, 504, 506, and 508 execute in order to implement one or more embodiments.

The processors 502, 504, 506, and 508 may communicate with each other using a logical peer-to-peer ring configuration, as shown in FIG. 5. In such a configuration, each processor only receives communications from one processor and only sends communications to one other processor in one direction around the ring. In this manner, the individual processors can relay a communication to the next processor in the ring until the communication is received by the destination processor.

As described above, if the processors 502, 504, 506, and 508 have computed intermediate matrices at block 208 of process 200, the processors then communicate their contributions to the individual columns subsets at block 210 of process 200. For example, the portions of the intermediate matrices that are to be aggregated to generate the columns of matrix 130 to be stored on processor 508 may be aggregated around the ring as shown in FIG. 5. At (1) and (2), processor 502 sends its contribution to processor 504 via switch 510. Processor 504 aggregates the contribution from processor 502 with its own contribution, and sends the aggregated contribution to processor 506. At (3), (4), (5), and (6), the aggregated contribution is transmitted to processor 506 via switch 510, CPU 514, and switch 512. At (7) and (8), processor 506 aggregates its own contribution with the aggregated contribution received from processor 504, and then communicates the result to processor 508 via switch 512. In addition, because the communications are relayed in one direction around the logical ring, multiple communications may occur in parallel, substantially simultaneously, or otherwise overlapping at least partially in time. For example, portions of the intermediate matrices used to compute the subset of columns to be stored on processor 502 may be aggregated and communicated around some portions of the ring configuration while, at the same time, the portions of the intermediate matrices used to compute the subset of columns to be stored on processors 504, 506, and/or 508 are aggregated and communicated around other portions of the ring configuration.

Figure 6:
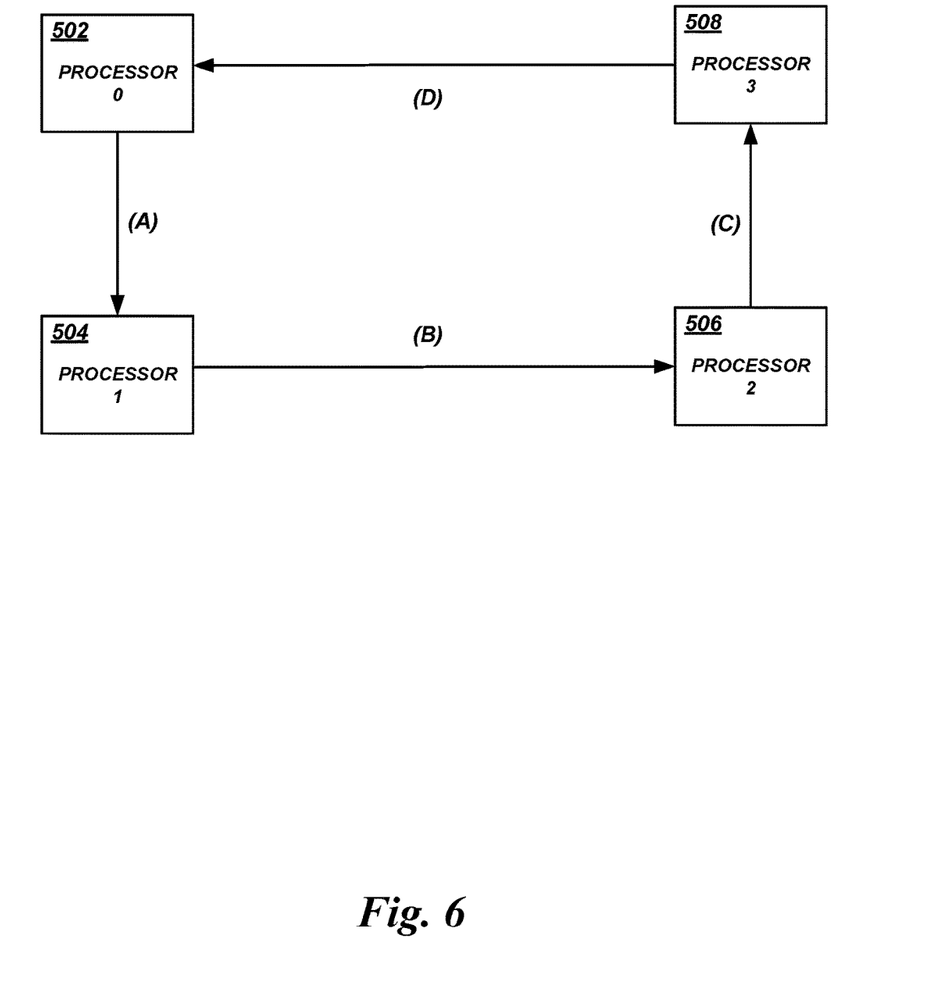
FIG. 6 is a block diagram of a plurality of computer processors communicating in an illustrative peer-to-peer ring configuration.

FIG. 6 is a simplified illustration of the logical peer-to-peer structure 600 described above. As shown, processor 502 sends, via processors 504 and 506, its contribution to the columns that are to be stored on processor 508. Because the contribution is sent around the peer-to-peer ring 600 via other processors before it arrives at processor 508, the contribution can be aggregated with contributions from the other processors 504 and 506 along the way. While this communication is occurring, or during some other communication described above, processor 502 may provide processor 504 with its contribution to another subset of columns of matrix 130. For example, the contribution may be to the subset of columns to be stored on processor 506. Although the transmission and aggregation of columns to be stored on processor 508 have not yet been completed, processor 502 may initiate this second transmission with no contention due to the peer-to-peer ring structure 600.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising a plurality of processors, the system programmed by executable instructions to at least:
    obtain data defining an artificial neural network, the artificial neural network comprising a first layer of nodes, a second layer of nodes, and a third layer of nodes, wherein the first layer comprises more nodes than the second layer, and wherein the second layer comprises fewer nodes than the third layer;
    provide parallelization of processing operations of the artificial neural network to reduce communications between the plurality of processors by conditionally synchronizing, among the plurality of processors, individual processing operations of the plurality of processors, wherein the executable instructions to provide parallelization of the processing operations of the artificial neural network comprise executable instructions to:
        provide to a first processor of the plurality of processors, based at least partly on the first layer comprising more nodes than the second layer and the second layer comprising fewer nodes than the third layer:
            a first column of input data from a first data matrix, the first data matrix comprising input data for the artificial neural network;
            a first row of weights from a first weight matrix, the first weight matrix comprising weights for connections between nodes of the first layer and nodes of the second layer; and
            a first column of weights from a second weight matrix, the second weight matrix comprising weights for connections between nodes of the second layer and nodes of the third layer;
        provide to a second processor of the plurality of processors, based at least partly on the first layer comprising more nodes than the second layer and the second layer comprising fewer nodes than the third layer:
            a second column of input data from the first data matrix;
            a second row of weights from the first weight matrix; and
            a second column of weights from the second weight matrix;
        compute, using the first processor, a first subset of columns of a second data matrix of values for the second layer, wherein the first subset is computed from the first column of input data, the first row of weights, and aggregated values received from the second processor of the plurality of processors;
        compute, using the second processor, a second subset of columns of the second data matrix, wherein the second subset is computed from the second column of input data, the second row of weights, and aggregated values received from the first processor of the plurality of processors;
        store, on each of the first and second processors, the second data matrix based at least partly on the second layer comprising fewer nodes than the third layer;
        compute, using the first processor, a third subset of columns of a third data matrix of values for the third layer, wherein the third subset is computed from the second data matrix and the first column of weights;
        compute, using the second processor, a fourth subset of columns of the third data matrix, wherein the fourth subset is computed from the second data matrix and the second column of weights; and
    generate, by the plurality of processors, output of the artificial neural network using the third data matrix.

2. The system of claim 1, wherein the plurality of processors are configured as a peer-to-peer ring, wherein the first processor transmits data to the second processor via a third processor of the plurality of processors, wherein the second processor transmits data to the third processor via the first processor, and wherein the third processor transmits data to the first processor via the second processor.

3. The system of claim 2, wherein the executable instructions to store the second data matrix on each of the first and second processors comprise executable instructions to at least:
    provide, by the first processor to the third processor, data computed from the first column of input data and the second row of weights; and
    provide, by the third processor to the second processor, data computed by the third processor aggregated with data received from the first processor.

4. The system of claim 1, wherein the first data matrix comprises a plurality of rows, and wherein individual rows of the plurality of rows comprise training data input vectors.

5. A computer-implemented method comprising:
    under control of a computer system comprising a plurality of computer processors, the computer system configured to execute specific computer-executable instructions,
    providing parallelization of processing operations of an artificial neural network to reduce communications between the plurality of computer processors by conditionally synchronizing, among the plurality of computer processors, individual processing operations of the plurality of computer processors by:
        determining, based at least partly on a size of a first layer matrix of values for a first layer of the artificial neural network being greater than a size of a second layer matrix of values to be generated for a second layer of the artificial neural network, that individual computer processors of the plurality of computer processors are to each generate a different contribution to the second layer matrix using a corresponding subset of columns of the first layer matrix and a corresponding subset of rows of a first weight matrix, wherein the first weight matrix comprises weights for connections between nodes of the first layer and nodes of the second layer;

generating, by the plurality of computer processors, the second layer matrix;

determining, based at least partly on a size of a third layer matrix of values for a third layer of the artificial neural network being less than a size of a fourth layer matrix of values to be generated for a fourth layer of the artificial neural network, that individual computer processors of the plurality of computer processors are to each generate a different subset of columns of the fourth layer matrix using the third layer matrix and a corresponding subset of columns of a second weight matrix, wherein the second weight matrix comprises weights for connections between nodes of the third layer and nodes of the fourth layer; and generating, by the plurality of computer processors, the fourth layer matrix.

6. The computer-implemented method of claim 5, wherein generating the second layer matrix comprises:

providing, by a first computer processor of the plurality of computer processors to a second computer processor of the plurality of computer processors, a first contribution to the second layer matrix, wherein the first contribution is based on at least one column of values computed by the first computer processor; and adding, by the second computer processor, the first contribution and a second contribution to generate at least one column of values for the second layer matrix, wherein the second contribution is based on at least one column of values computed by the second computer processor.

7. The computer-implemented method of claim 5, further comprising providing, by a first computer processor of the plurality of computer processors to a second computer processor of the plurality of computer processors, a first column of the third layer matrix, wherein the first column is computed by the first computer processor, and wherein the second computer processor previously computed a second column of the third layer matrix different than the first column.

8. The computer implemented method of claim 5, wherein the third layer matrix comprises the second layer matrix.

9. The computer-implemented method of claim 5, wherein the first layer matrix comprises the fourth layer matrix.

10. The computer-implemented method of claim 5, wherein a first computer processor of the plurality of computer processors transmits data to a second computer processor of the plurality of computer processors via a third computer processor of the plurality of computer processors, wherein the second computer processor transmits data to the third computer processor via the first computer processor, and wherein the third computer processor transmits data to the first computer processor via the second computer processor.

11. The computer-implemented method of claim 10, wherein the first computer processor and second computer processor communicate with each other via a first switch, and wherein third computer processor and a fourth computer processor of the plurality of computer processors communicate with each other via a second switch separate from the first switch.

12. The computer-implemented method of claim 5, wherein the first layer matrix comprises a plurality of rows of training data input to the artificial neural network.

13. The computer-implemented method of claim 5, further comprising performing, using the artificial neural network, at least one of product recommendation generation, automatic speech recognition, facial recognition, handwriting recognition, or image recognition.

14. A system comprising a plurality of computer processors, the system configured by executable instructions to at least:

provide parallelization of processing operations of an artificial neural network to reduce communications between the plurality of computer processors by conditionally synchronizing, among the plurality of computer processors, individual operations of the plurality of computer processors, wherein the executable instructions to provide parallelization of the processing operations of the artificial neural network comprise executable instructions to:

determine, based at least partly on a size of a first layer matrix of values for a first layer of the artificial neural network being greater than a size of a second layer matrix of values to be generated for a second layer of the artificial neural network, that individual computer processors of the plurality of computer processors are to each generate a different contribution to the second layer matrix using a corresponding subset of columns of the first layer matrix and a corresponding subset of rows of a first weight matrix, wherein the first weight matrix comprises weights for connections between nodes of the first layer and nodes of the second layer;

generate, by the plurality of computer processors, the second layer matrix;

determine, based at least partly on a size of a third layer matrix of values for a third layer of the artificial neural network being less than a size of a fourth layer matrix of values to be generated for a fourth layer of the artificial neural network, that individual computer processors of the plurality of computer processors are to each generate a different subset of columns of the fourth layer matrix using the third layer matrix and a corresponding subset of columns of a second weight matrix, wherein the second weight matrix comprises weights for connections between nodes of the third layer and nodes of the fourth layer; and generate, by the plurality of computer processors, the fourth layer matrix.

15. The system of claim 14, wherein the executable instructions to generate the second layer matrix comprise executable instructions to:

provide, by a first computer processor of the plurality of computer processors to a second computer processor of the plurality of computer processors, a first contribution to the second layer matrix, wherein the first contribution is based on at least one column of values computed by the first computer processor; and add, by the second computer processor, the first contribution and a second contribution to generate at least one column of values for the second layer matrix, wherein the second contribution is based on at least one column of values computed by the second computer processor.

16. The system of claim 14, further configured by the executable instructions to provide, by a first computer processor of the plurality of computer processors to a second computer processor of the plurality of computer processors, a first column of the third layer matrix, wherein the first column is computed by the first computer processor, and wherein the second computer processor previously computed a second column of the third layer matrix different than the first column.

17. The system of claim 14, wherein the third layer matrix comprises the second layer matrix.

18. The system of claim 14, wherein the first layer matrix comprises the fourth layer matrix.

19. The system of claim 14, wherein a first computer processor of the plurality of computer processors transmits data to a second computer processor of the plurality of computer processors via a third computer processor of the plurality of computer processors, wherein the second computer processor transmits data to the third computer processor via the first computer processor, and wherein the third computer processor transmits data to the first computer processor via the second computer processor.

20. The system of claim 19, wherein the first computer processor and second computer processor communicate with each other via a first switch, and wherein third computer processor and a fourth computer processor of the plurality of computer processors communicate with each other via a second switch separate from the first switch.

* * * * *

UNITED STATES PATENT AND TRADEMARK OFFICE
CERTIFICATE OF CORRECTION

PATENT NO. : 10,482,380 B2  
APPLICATION NO. : 14/984510  
DATED : November 19, 2019  
INVENTOR(S) : Scott Michael Le Grand et al.

It is certified that error appears in the above-identified patent and that said Letters Patent is hereby corrected as shown below:

In the Specification

In Column 6, Line 42, delete "$3n_{1+1}$" and insert --$3n_{i+1}$--.

In the Claims

In Column 15, Line 46, Claim 8, delete "computer implemented" and insert --computer-implemented--.

Signed and Sealed this  
Twenty-fifth Day of February, 2020

Andrei Iancu  
*Director of the United States Patent and Trademark Office*